US012780520B2

(12) United States Patent
Gokhale et al.

(10) Patent No.: US 12,780,520 B2
(45) Date of Patent: Nov. 3, 2026

(54) PACKAGING FILM FOR RETORT APPLICATIONS

(71) Applicant: AMCOR FLEXIBLES NORTH AMERICA, INC., Neenah, WI (US)

(72) Inventors: Ankush A. Gokhale, Fulshear, TX (US); James R. Lamb, Appleton, WI (US); Kevin J. Curie, Appleton, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 727 days.

(21) Appl. No.: 18/024,439

(22) PCT Filed: Sep. 17, 2020

(86) PCT No.: PCT/US2020/051336

§ 371 (c)(1),
(2) Date: Mar. 2, 2023

(87) PCT Pub. No.: WO2022/060362

PCT Pub. Date: Mar. 24, 2022

(65) Prior Publication Data

US 2023/0278770 A1 Sep. 7, 2023

(51) Int. Cl.

| | |
|---|---|
| ***B65D 75/26*** | (2006.01) |
| ***B32B 7/12*** | (2006.01) |
| ***B32B 27/08*** | (2006.01) |
| ***B32B 27/30*** | (2006.01) |
| ***B32B 27/32*** | (2006.01) |
| ***B32B 27/34*** | (2006.01) |
| ***B65D 75/00*** | (2006.01) |
| ***B65D 77/20*** | (2006.01) |

(52) U.S. Cl.

CPC ................ *B65D 75/26* (2013.01); *B32B 7/12* (2013.01); *B32B 27/08* (2013.01); *B32B 27/306* (2013.01); *B32B 27/32* (2013.01); *B32B 27/34* (2013.01); *B65D 75/008* (2013.01); *B65D 77/2024* (2013.01); *B32B 2250/24* (2013.01); *B32B 2307/514* (2013.01); *B32B 2307/7246* (2013.01); *B32B 2307/7376* (2023.05); *B32B 2439/46* (2013.01); *B65D 2207/00* (2013.01); *B65D 2577/2025* (2013.01)

(58) Field of Classification Search

None

See application file for complete search history.

(56) References Cited

U.S. PATENT DOCUMENTS

| | | | | |
|---|---|---|---|---|
| 4,561,920 | A * | 12/1985 | Foster | B32B 27/08 156/244.11 |
| 2009/0317611 | A1 * | 12/2009 | Mueller | B32B 7/02 53/562 |
| 2010/0015423 | A1 | 1/2010 | Schaefer et al. | |
| 2011/0091695 | A1 | 4/2011 | Bevilacqua et al. | |
| 2013/0216738 | A1 | 8/2013 | Owusu et al. | |
| 2015/0231857 | A1 | 8/2015 | Arnaud | |
| 2018/0170017 | A1 | 6/2018 | Ettridge et al. | |

FOREIGN PATENT DOCUMENTS

| | | | |
|---|---|---|---|
| JP | 2014226099 | A | 12/2014 |
| WO | 2006094733 | A1 | 9/2006 |
| WO | 2009158002 | A1 | 12/2009 |
| WO | 2011014330 | A1 | 2/2011 |
| WO | 2018172510 | A1 | 9/2018 |
| WO | 2018182712 | A1 | 10/2018 |
| WO | 2019083675 | A1 | 5/2019 |
| WO | 2021221613 | A1 | 11/2021 |

OTHER PUBLICATIONS

PCT International Search Report, International Application No. PCT/US2020/051336, issued Dec. 15, 2020, 2 pages.

* cited by examiner

*Primary Examiner* — Sheeba Ahmed

(57) ABSTRACT

A multilayer barrier film comprises an oriented outer film and a sealing layer attached to the oriented outer film, and the oriented outer film has 1) a first exterior layer containing a first polymeric material having a moisture vapor transmission rate (MVTR) of greater than or equal to 10 gram·mil/100 $in^2$/day, 2) a first EVOH layer adjacent to the first exterior layer, 3) an interior layer adjacent to the first EVOH layer, and 4) a second EVOH layer adjacent to the interior layer, the multibarrier film exhibiting rapid recovery of oxygen transmission barrier after exposure to a retort process.

19 Claims, 5 Drawing Sheets

PACKAGING FILM FOR RETORT APPLICATIONS

TECHNICAL FIELD

This disclosure is related to multilayer barrier film structures, in particular film structures suitable for packaging products that are retort sterilized. The laminates described herein exhibit superior retort shock barrier recovery.

BACKGROUND

Retort operations are used for thermal processing of food and sterilization of the primary packaging components. Food packaged in a retortable container, such as a pouch, is transferred to an autoclave unit where it is subjected to retort conditions including humid or wet environments, temperatures generally exceeding the boiling point of water and elevated pressures, for a specific time period. Retortable containers, therefore, are designed to withstand retort conditions.

Ethylene-vinyl alcohol ("EVOH") copolymers are well-known for their oxygen gas barrier properties. Effectiveness of an EVOH oxygen barrier is highly dependent on relative humidity. That is, exposure to humidity results in reduced capacity of the EVOH to provide a gas barrier, which can be measured as an oxygen transmission rate (OTR). As an oxygen gas barrier, lower OTRs are desired. In coextruded films, in addition to its oxygen barrier properties, EVOH has excellent durability and good appearance, which are desired features in retortable containers.

Some films for retort utilize a protective high moisture barrier outer layer on an EVOH-containing film. Even so, an increase in OTR after exposure of retortable containers to retort conditions is expected due to exposure of the container to wet-heat conditions. This temporary increase in OTR is referred to as retort-shock. The loss in oxygen barrier/increase in OTR is, for the most part, reversible and the oxygen barrier recovers as the material dries out. Some EVOH-containing retortable containers in the state of the art can experience long retort-shock recovery times in that only after a longer period of time (days/weeks) does the oxygen barrier become fully established again.

Some other retort packaging products may combine materials such as oriented polyethylene terephthalate (OPET), biaxially-oriented nylon (BON), AlOx, foil, and the like with a polypropylene sealant. Such products are made by laminating multiple plies to form, for example, 3-ply and 4-ply structures. These laminations can suffer from issues of durability and poor recyclability options.

There is an on-going need to provide EVOH-containing films for packaging that provide good retort-shock recovery, a long shelf-life, a high barrier to oxygen, and recyclability options.

SUMMARY

Described herein are EVOH containing high barrier flexible packaging films suitable for retort applications. The film designs significantly improve the retort shock (i.e. temporary loss of oxygen barrier post retort) experienced with other EVOH containing retort packaging films while retaining all other benefits of EVOH containing films such as transparency and durability.

An embodiment of an EVOH containing high barrier flexible packaging films suitable for retort applications is a multilayer barrier film comprising an oriented outer film and a sealing layer attached to the oriented outer film. The oriented outer film has a first exterior layer, the first exterior layer having a first polymeric material with a moisture vapor transmission rate (MVTR) of greater than or equal to 10 gram·mil/100 $in^2$/day. The oriented outer film also has a first EVOH layer adjacent to the first exterior layer, the first EVOH layer having a first ethylene vinyl alcohol copolymer. In addition, the oriented outer film has an interior layer adjacent to the first EVOH layer, and a second EVOH layer adjacent to the interior layer, the second EVOH layer having a second ethylene vinyl alcohol copolymer. The sealing layer is attached to a surface of the oriented outer film.

In some embodiments, the moisture vapor transmission rate (MVTR) of the first polymeric material of the first exterior layer is in a range of greater than 10 gram·mil/100 $in^2$/day to less than 80 gram·mil/100 $in^2$/day.

In some embodiments, the first polymeric material is a polyamide.

In some embodiments, the interior layer has a second polymeric material having a moisture vapor transmission rate (MVTR) greater than or equal to 10 gram·mil/100 $in^2$/day.

In some embodiments, the interior layer has a second polymeric material having a moisture vapor transmission rate (MVTR) in a range of greater than 10 gram·mil/100 $in^2$/day to less than 80 gram·mil/100 $in^2$/day.

In some embodiments, the interior layer has a second polymeric material and the second polymeric material is a polyamide.

In some embodiments, the oriented outer film further has a second exterior layer having a third polymeric material. The third polymeric material may be a polyamide.

In some embodiments, the sealing layer has a propylene-based polymer.

In some embodiments, the sealing layer is part of a non-oriented film.

In some embodiments, the multilayer barrier film further has an adhesive layer between the sealing layer and the outer oriented film.

In some embodiments, the multilayer barrier film further has a print layer between the sealing layer and the oriented outer film.

In some embodiments, a thickness of the oriented outer film is greater than or equal to 10 microns and less than or equal to 76 microns.

In some embodiments, an overall composition of the multilayer barrier film comprises less than or equal to 10% polyamide by weight.

In some embodiments, an overall composition of the multilayer barrier film comprises less than or equal to 10% EVOH by weight.

Another embodiment of the multilayer barrier film has an oriented outer film having, i) a first surface having a first exterior layer, the first exterior layer containing a first polyamide, ii) a first EVOH layer adjacent to the first exterior layer, the first EVOH layer containing a first ethylene vinyl alcohol copolymer, iii) an interior layer adjacent to the first EVOH layer, the interior layer containing a first propylene-based polymer, iv) a second EVOH layer adjacent to the interior layer, the second EVOH layer containing a second ethylene vinyl alcohol copolymer, and v) a second surface containing a second exterior layer. This embodiment may include a print layer located on at least one of the first surface and the second surface of the oriented outer film, and a sealing layer containing a second propylene-based polymer. The sealing layer is connected to the second surface of the oriented outer film.

In some embodiments, an overall composition of the multilayer barrier film comprises less than or equal to 10% polyamide by weight and less than or equal to 10% EVOH by weight.

In some embodiments, the multilayer barrier film is free from polyester layers and metal layers.

An embodiment of a retort sterilized packaged product can be made using a multilayer barrier film having an oriented outer film and a sealing layer attached to the oriented outer film, the oriented outer film containing a first surface containing a first exterior layer, the first exterior layer containing a first polymeric material having a moisture vapor transmission rate (MVTR) of greater than or equal to 10 gram·mil/100 in$^2$/day, a first EVOH layer adjacent to the first exterior layer, the first EVOH layer containing a first ethylene vinyl alcohol copolymer, an interior layer adjacent to the first EVOH layer, a second EVOH layer adjacent to the interior layer, the second EVOH layer containing a second ethylene vinyl alcohol copolymer, and a second surface. The sealing layer is attached to the second surface of the oriented outer film. The sealing layer may be contained in a non-oriented film.

BRIEF DESCRIPTION OF THE DRAWINGS

The disclosure may be more completely understood in consideration of the following detailed description of various embodiments of the disclosure in connection with the accompanying drawings, in which.

Figure 1A:
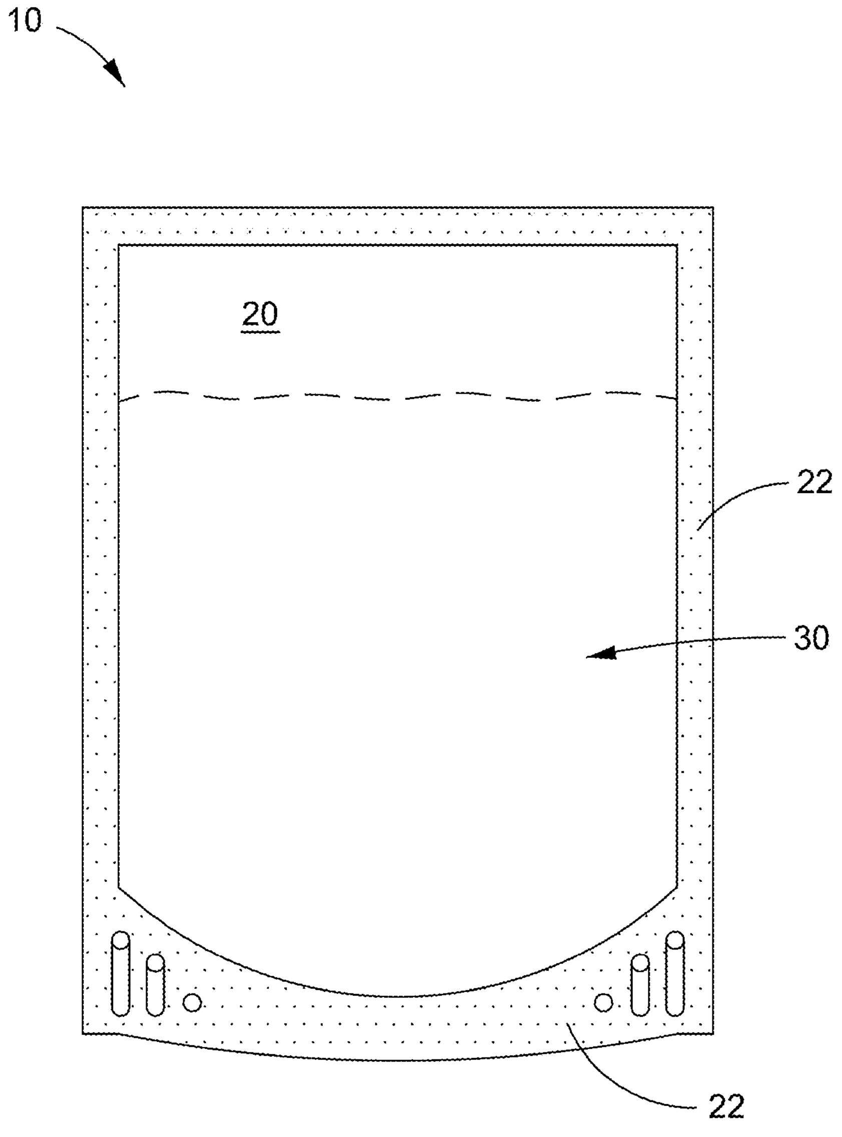
FIGS. 1A through 1D are plan views of various embodiments of packaged products employing multilayer barrier films.

The drawings show some but not all embodiments. The elements depicted in the drawings are illustrative and not necessarily to scale, and the same (or similar) reference numbers denote the same (or similar) features throughout the drawings.

DETAILED DESCRIPTION

High barrier films used to package products that undergo retort sterilization often contain several different materials to attempt to achieve satisfactory shelf-life and appearance for the product. These solutions historically contain materials such as polyester, aluminum foil or inorganic coatings, such as silicon oxide. Films containing such materials often suffer from various drawbacks. Films containing polyester are difficult to recycle, making them undesirable to consumers. Films containing aluminum foil or similar barrier layers suffer from recyclability concerns, and additionally render the packaging material opaque, both undesirable traits for some applications. Films that use inorganic coatings, while being easier to recycle and having high clarity, are less durable and tend to lose barrier in applications that involve significant abuse of the package (i.e. flexing). In some cases, films containing ethylene vinyl alcohol copolymer (EVOH) layers are used to attempt to avoid these drawbacks.

An EVOH layer can be used in a film as a durable and clear option to provide high barrier protection for packaged products. However, EVOH containing films can exhibit poor performance in retort applications due to the high moisture sensitivity and low temperature resistance of these materials. EVOH can blister and lose oxygen barrier upon exposure to high temperatures and humidity levels such as those used for retort sterilization.

The high barrier film structures described herein allow the use of EVOH materials, using specifically prescribed layers to both protect the EVOH and allow the EVOH layers to dry out quickly and regain oxygen barrier effectiveness. Additionally, the portion of the high barrier film structure that contains the EVOH layers is oriented, providing for the opportunity to 1) introduce a buried print layer, 2) add stiffness without adding bulk to the structure and 3) minimize the EVOH and other functional materials to a level that will allow the film to be recycled more easily.

Provided are films and retort packages that provide excellent retort-shock recovery. A quickly recovering oxygen transmission rate (OTR) after exposure to retort conditions can be achieved by films that include a moisture transmissive exterior layer in conjunction with two interior ethylene-vinyl alcohol ("EVOH")-containing layers separated by another layer. The exterior layer allows at least the first of the two EVOH layers to dry out quickly post-retort to more quickly regain the oxygen barrier properties, and additionally provides some protection to the EVOH to prevent blistering. The layer between the EVOH containing layers can be modified to give the appropriate protection to the second EVOH containing layer, and primarily acts to allow the two EVOH layers to work independently. For example, during the retort process, the first EVOH layer may be exposed to high humidity levels, rendering it a very poor barrier to oxygen, while the second EVOH layer, which is better protected from moisture, maintains a minimal barrier level. Post retort, the first EVOH layer dries quickly and the barrier performance returns, while the second EVOH layer dries more slowly, prolonging the time period during which the barrier is lower. To put it another way, the first EVOH layer experiences a very severe decrease in barrier during retort but recovers quickly after retort. The second EVOH layer experiences a much less severe decrease in barrier during retort but recovers very slowly after retort. By using both layers together, the film can offer sufficient barrier throughout retort processing and the extended shelf-life of retorted products. The films described herein advantageously provide better overall shelf-life barrier properties than previously designed EVOH containing packaging films.

Additionally, the EVOH layers, the high transmission exterior layer and the layer between the EVOH layers are formed within an oriented film (or more than one oriented film) which makes up the exterior surface of the high barrier film. Orientation of these highly functional layers can add several key advantages to the film. Upon orientation, the characteristics of the layers and the film may improve (i.e. increased stiffness, better clarity or increased barrier) or remain sufficient while reducing the overall content of these materials. Reduction of certain functional materials, such as EVOH or polyamide, increase the recyclability of the overall film structure.

Orientation of the outer film provides certain property improvements including increased stiffness, increased clarity and dimensional stability. The dimensional stability of such a film enables this portion of the film structure to be printed by means typical for flexible packaging converting (i.e. flexographic or rotogravure printing). Printability of this material eliminates the need for added labels, further eliminating additional materials and minimizing the environmental footprint of the package. Good clarity of the outer film gives an optimal view of any buried print layers.

While it is advantageous to have the outer film portion of the structure oriented, it is also advantageous to have the sealing portion of the structure (the sealing layer), unoriented. For retort packaging, the sealing performance is extremely important in maintaining a sterile container. The sealing layers are typically constructed of propylene-based polymer materials that have specific bulk and physical properties to achieve and maintain suitable heat seals. Good sealing is preferably achieved with a sealing layer that has been made by a cast or blown extrusion process, without any significant orientation of the layer.

The films described herein advantageously provide excellent product protection without the use of materials such as polyester and metal foils. These types of materials are more difficult to recycle and moving to EVOH based high-performance films such as those described herein, retort packaging can be more recycling friendly while retaining suitable barrier performance.

Retort Sterilized Packaged Product

The multilayer barrier films are designed to be used as packaging components for retort sterilized products. The suitable types of packed products are exemplified by, but not limited to, the formats shown in FIGS. 1A through 1D.

FIG. 1A shows an exemplary retort sterilized packaged product 10 having the format of a stand-up pouch with a product therein. The pouch is formed from at least one multilayer barrier film 20 using heat seals 22 to bond the components and create a hermetically sealed package containing the product 30.

The product contained within the package may be a food or pharmaceutical product, or another product that benefits from retort processing. Generally, retort processing sterilizes the product and the package after the product has been hermetically sealed within the package. If the packaging materials and the seals forming the package have high enough barrier to environmental elements such as oxygen, moisture and microbes, the product remains unchanged or minimally changed for an extended period. Products packaged in this manner are typically referred to as shelf-stable as they do not require refrigeration.

A retort sterilized packaged product may include one or more multilayer barrier films as described herein and may or may not include other packaging components, not of a structure described herein. For example, a stand-up pouch such as shown in FIG. 1A may have a front and back panel formed from clear multilayer barrier films as described herein. The gusset panel may be formed from a similar structure (of the invention) that is white pigmented instead of clear. Alternatively, the gusset panel may be formed from a structure that is not of the type described herein. Preferably, the entire package is constructed from barrier films as described herein.

Figure 1B:
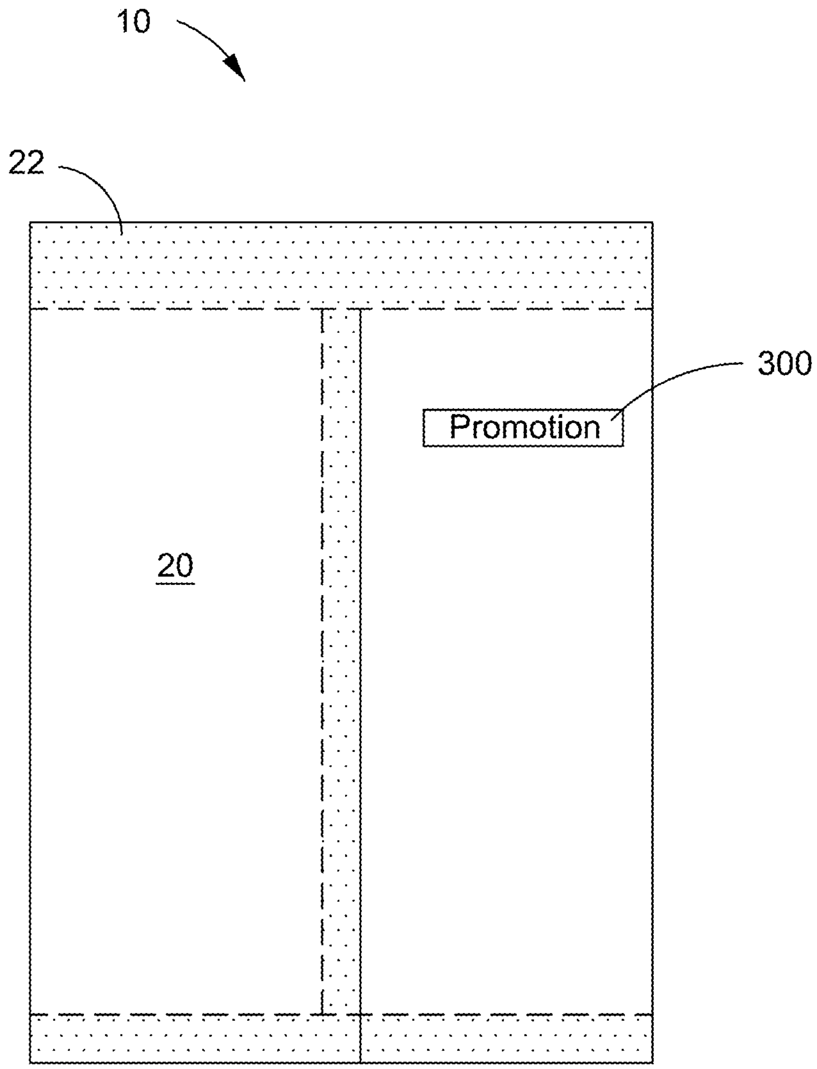

FIG. 1B shows an exemplary retort sterilized packaged product 10 having the format for a flow-wrap style pouch. The pouch is formed from a single multilayer barrier film 20 using heat seals 22. While printing is not specific to this embodiment of the retort sterilized packaged product, FIG. 1B shows a print layer 300 that is visible from the exterior of the package. As will be discussed, the print layer may be in various positions of the multilayer barrier film structure. Not visible in FIG. 1B is the product hermetically sealed within the sealed multilayer barrier film 20.

Figure 1C:
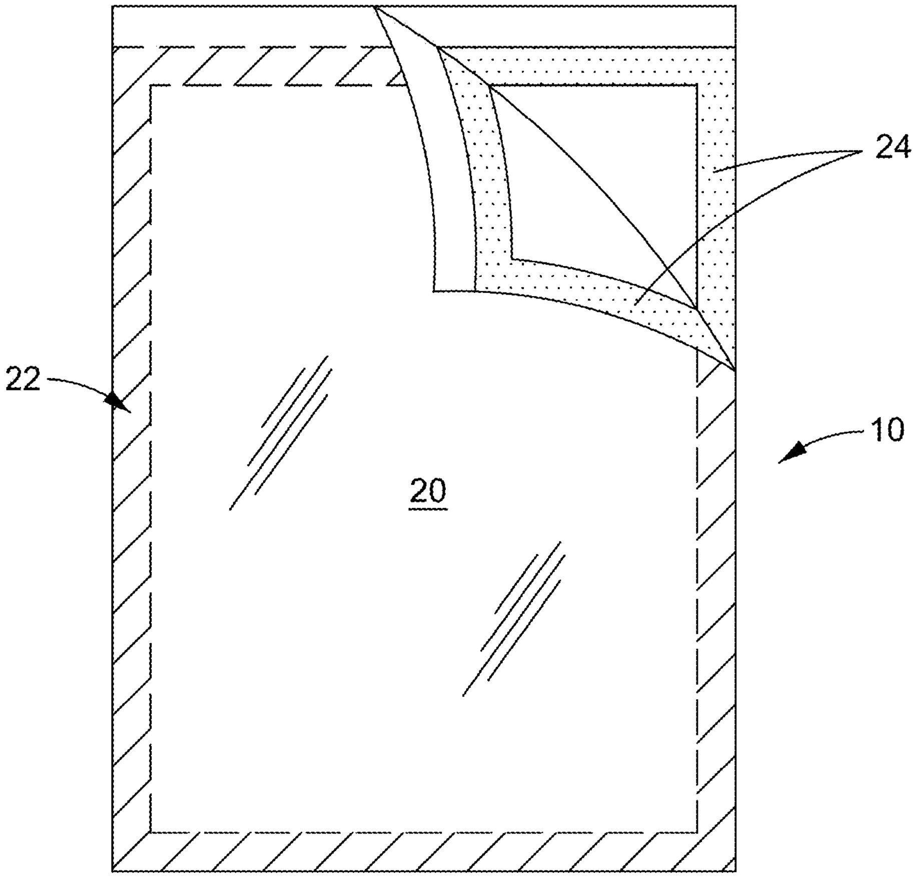

FIG. 1C shows an exemplary retort sterilized packaged product 10 having the format of a sachet, peeled open such that the product may be removed. The sachet has a front and back panel, either or both of which may be formed from the multilayer barrier film 20 described herein. The front and back panel are attached by heat seals 22. While a peel open feature is not specific to this embodiment, FIG. 1C shows that the seals used to form the package may be of the type that can be peeled open, allowing the consumer to access the product therein. Shaded area 24 shows where a heat seal had been formed but is now peeled apart. Not visible in FIG. 1C is the product contained within the package.

Figure 1D:
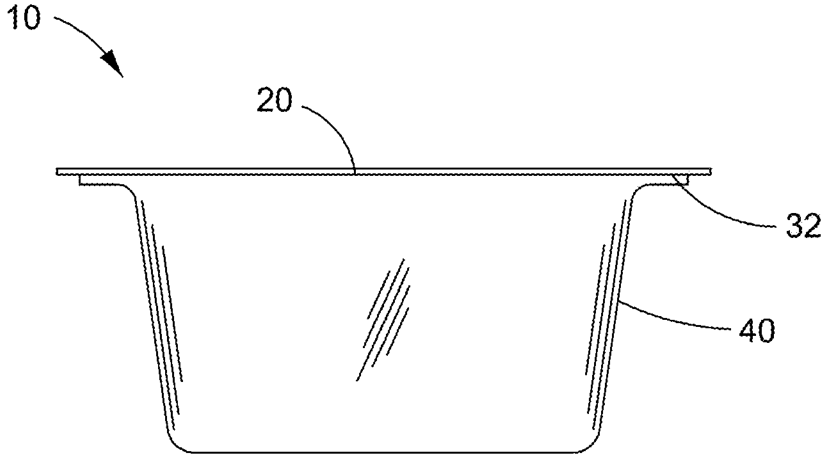

FIG. 1D shows an exemplary retort sterilized packaged product 10 having the format of a cup 40 and a lid, the lid being specifically formed from the multilayer barrier film 20 described herein. The lid is attached to the cup by heat seals 22 at the flange of the cup. In this format, the cup may be flexible, semi-rigid or rigid and may have one or more compartments formed therein. Not visible in FIG. 1D is the product hermetically sealed within the packaged sealed by the multilayer barrier film 20.

As used herein, "retort packaging" or a "retort sterilized packaged product" is a film packaging component, or package made from the film, that can be filled with product, sealed, and remain hermetically sealed after being exposed to a typical retort sterilization process. Typical retort sterilization is a batch process that uses temperatures from about 100° C. to about 150° C., over-pressure up to about 70 psi (483 kPa), and may have a duration from a few minutes up to several hours. Common retort processes used for products packaged in flexible films include steam or water immersion. Food or other products packaged in retort packaging film and retort sterilized can be stored at ambient conditions for extended periods of time (i.e. are shelf-stable), retaining sterility. Because the retort process is incredibly abusive, very specialized flexible packaging films have been designed to survive the process.

One advantage of the retort packaging described herein is that it uses the a more durable option of barrier material, namely EVOH. EVOH provides excellent oxygen barrier with greater resistance to cracking, when compared to inorganic oxide coated materials. However, EVOH is prone to humid conditions, and the retort process can cause the material to temporarily lose oxygen barrier properties. However, it has been found that by using the multilayer barrier film structures as described herein, an optimal oxygen barrier performance can be achieved through the shelf-life of the product. Using the multilayer barrier films described herein, the dip in oxygen barrier typically exhibited by EVOH films just after the retort process (i.e. retort shock), can be minimized providing for a low oxygen ingress value over the presumed shelf-life of the packaged product.

Multilayer Barrier Film

The term "layer", as used herein, refers to a building block of a film that is a structure of a single material type or a homogeneous blend of materials. A layer may be a single polymer, a blend of materials within a single polymer type or a blend of various polymers, may contain metallic materials and may have additives. Layers may be continuous with the film or may be discontinuous or patterned. A layer has an insignificant thickness as compared to the length and width, and therefore is defined to have two major surfaces, the area of which are defined by the length and width of the layer. An exterior layer is one that is connected to another layer at only one of the major surfaces. In other words, one major surface of an exterior layer is exposed. An interior layer is one that is connected to another layer at both major surfaces. In other words, an interior layer is between two other layers. A layer may contain sublayers of identical or different material makeup.

Similarly, the term "film", as used herein, refers to a web built of layers and/or films, having a thickness that is insignificant as compared to the length and width of the film. A film has two major surfaces (i.e. two surfaces, a first and second surface), the area of which are defined by the length and width of the film. The major surfaces are on the exterior of the film.

Figure 2A:
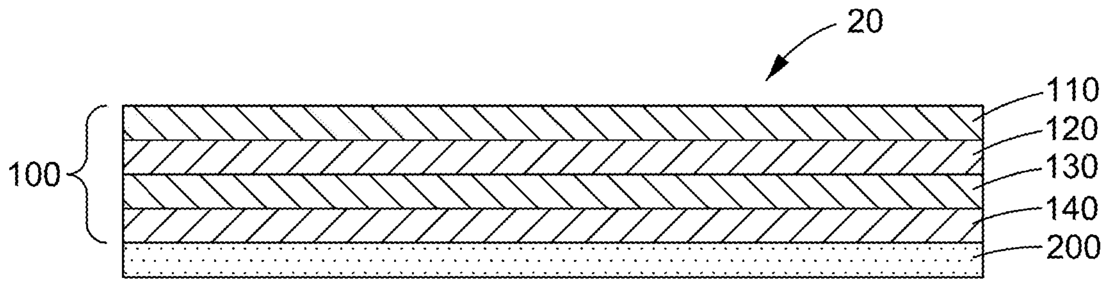
FIGS. 2A and 2B are cross-sectional views of embodiments of the multilayer barrier film indicating details of the oriented outer film.

An exemplary embodiment of the multilayer barrier film that is useful in retort packaging and exhibits reduced retort shock is shown in FIG. 2A. The multilayer barrier film 20 has an oriented outer film 100, which has a first surface and a second surface, and a sealing layer 200 attached to the oriented outer film. The oriented outer film 100 has a first exterior layer 110, a first EVOH layer 120 adjacent to the first exterior layer, an interior layer 130 adjacent to the first EVOH layer and a second EVOH layer 140 adjacent to the interior layer. The sealing layer is attached to the oriented outer film such that the first EVOH layer is further from the sealing layer than the second EVOH layer. In this configuration, the first exterior layer 110 is the first surface and the second EVOH layer 140 is the second surface of the oriented outer film 100. In this configuration, the first exterior layer 110 and the sealing layer 200 define the surfaces of the multilayer barrier film 20. The interior layer 130 is between the first EVOH layer 120 and the second EVOH layer 140.

As used herein, layers or films that are "adjacent" are connected to one another with or without an intervening layer or film. Layers or films that are "directly adjacent" are connected to one another without an intervening layer or film.

In some embodiments of the multilayer barrier film, the first EVOH layer is directly adjacent to the first exterior layer. In some embodiments of the multilayer barrier film, the interior layer is directly adjacent to the first EVOH layer. In some embodiments of the multilayer barrier film, the second EVOH layer is directly adjacent to the interior layer. In some embodiments of the multilayer barrier film one or more of the first exterior layer, the first EVOH layer, the interior layer and the second EVOH layer may have sub-layers therein. In some embodiments, the multilayer barrier film is free from polyester layers and metal layers, which means that. In some embodiments, the multilayer barrier film excludes a polyester layer and a metal layer.

The multilayer barrier film may have one or more layers for the functionality of adhesion, such as tie layers or adhesive layers. The term "tie layer," "adhesive", "adhesive layer," or "adhesive coating," refers to a material placed on one or more layers, partially or entirely, to promote the adhesion of that layer to another surface. A "tie layer" refers to a polymeric based material that is coextruded with other layers for the purpose of providing adhesion between two other layers. The tie layers may also contain materials for other functionality such as moisture barrier. In some embodiments, the tie layer(s) in the film contains an ethylene-based or propylene-based polymer that has maleic anhydride grafted functionality. "Adhesive", "adhesive layers" or "adhesive coatings" are positioned between two films or layers to maintain the two materials in position relative to each other and prevent undesirable delamination. Unless otherwise indicated, an adhesive layer or a coating can have any suitable composition that provides a desired level of adhesion with the one or more surfaces in contact with the adhesive layer material. Adhesives used in flexible films used for retort applications are typically of a type specifically designed to withstand the uniquely abusive process.

The multilayer barrier film may contain other functional layers, such as bulk layers, layers for pigmenting, or barrier layers, provided the content of these layers does not frustrate the retortability, recyclability or overall functionality of the film.

The oriented outer film of the multilayer barrier film may be fabricated by any known methods. The layers of the oriented outer film can be extruded either in combination (coextrusion) or separately. If done separately, the layers can be combined by known methods of lamination including adhesive lamination or extrusion lamination. Alternatively, layers of the oriented outer film can be combined by extrusion coating, solution coating, or any other known converting method. A combination of extrusion and lamination processes may be used to manufacture the oriented outer film. The oriented outer film, or any particular layers of the oriented outer film, may be extruded using either flat or annular die type processes. Preferably, all layers of the oriented outer film are coextruded together (i.e. the oriented outer film is fully coextruded).

The oriented outer film may also be made up of multiple films, each oriented, laminated by any known means.

The thickness of the oriented outer film is generally from about 10 microns (0.39 mil) to about 76 microns (3.0 mil), and typically from about 12 microns (0.47 mil) to about 63.5 microns (2.5 mil).

Orientation of the outer film may be mono-directional (machine direction or transverse direction), or bi-directional stretching of the film, increasing the machine direction and/or transverse direction dimension and subsequently decreasing the thickness of the material. Bi-directional orientation may be imparted to the film simultaneously or successively. Stretching in either or both directions is subjected to the film in the solid phase at a temperature just below the melt temperature of the polymers in the film. In this manner, the stretching causes the polymer chains to "orient", changing the physical properties of the film. At the same time, the stretching thins the film. The resulting films are thinner and can exhibit significant changes in mechanical properties such as toughness, heat resistance, stiffness, dimensional stability, tear strength and barrier, as compared to the original unoriented film.

The amount of orientation imparted on the oriented outer film can affect the properties thereof. It has been found that in the case of a machine direction oriented outer film, stretching of at least 2× (2 times) leads to optimal film properties, such as stiffness and appearance. However, in some embodiments the oriented outer film may be stretched to a level less than 2×. In other embodiments the oriented outer film may be machine direction stretched more than 2×, at least 2.5×, 3.0×, 3.5×, 4×, 5×, 6×, any value in between these, or more. In other words, the dimension of the film is increased 2 times the original length, increased 2.5 times the original length, etc. Biaxially oriented films may be stretched at similar levels as mono-oriented films, through either a tenter-frame process (flat die) or a bubble process (tubular die).

Also important to the properties of the oriented outer film is the annealing process. After orientation and subsequent cooling, the films have an embedded stress. Upon heating the film, this stress may be released, causing the films to shrink back to their original, pre-orientation, dimension. This may be problematic when applying heat to the oriented outer film during the process of heat sealing the multilayer barrier film in a packaging application. Shrinking of the oriented outer film at this point will result in a poor appearance in the heat seal area of the package. Additionally, a film that exhibits shrink under heat conditions will be very difficult to apply printed indicia to, as this process generally uses high temperatures. The process of annealing can help alleviate the embedded stress caused by orientation and the film will be "heat set" such that it will not shrink back to the original size at critical operating temperatures. It has been found that annealing the film using annealing rollers, results in an oriented outer film that can be converted easily (printed/laminated/etc.) and is capable of being part of a multilayer barrier film that can be heat sealed to other packaging components without detrimental visual effects (i.e. without shrinking significantly).

The oriented outer film may be oriented and annealed in line. The oriented outer film may be biaxially oriented and annealed in line using known processes, such as the triple bubble process. The oriented outer film may be coextruded on a flat die system with machine direction orientation and annealing in-line. The oriented outer film may be coextruded on a flat die system and machine direction stretched followed by transverse direction stretched (i.e. tenter frame orientation process) and annealed in-line. Alternatively, the processes of orientation and annealing may be done in separate processes. Annealing is typically accomplished in-line through high diameter rollers set up at temperatures a few degrees lower than the melting point of the polymer or blend of polymers present in the film. However, annealing can be done by any known means including hot air or infrared heating.

In some multilayer barrier films, the oriented outer film is oriented and annealed such that the oriented outer film has a free shrink value of less than 10% in both the machine direction and the transverse direction tested according to ASTM D2732 using bath temperature of 90° C. The oriented outer film may have a free shrink value of less than 10%, less than 8%, less than 6%, less than 4% or less than 2% in both or either of the machine direction and the transverse direction. The oriented outer film may have been oriented such that the machine direction elongation at break of the oriented outer film is less than 100%.

The oriented outer film has a first exterior layer having a first polymeric material having a moisture vapor transmission rate (MVTR) of greater than or equal to 10 gram·mil/100 $in^2$/day. The first polymeric material may be present in the first exterior layer at a level of greater than 50%, greater than 75% or greater than 90% by weight. The first exterior layer may contain essentially 100% of the first polymeric material. The first exterior layer is, upon formation of a retort package, disposed furthest from the product.

Reference to "moisture vapor transmission rate" (MVTR) is the ability of a polymeric layer to transmit moisture therethrough as measured in accordance with ASTM-1249-13 entitled "Standard Test Method for Water Vapor Transmission Rate Through Plastic Film and Sheeting Using a Modulated Infrared Sensor." Conditions for measurement include: atmospheric pressure, 38° C., and 90% relative humidity unless otherwise stated.

Reference to "oxygen transmission rate" (OTR) is the ability of a polymeric film to transmit oxygen therethrough as measured in accordance with ASTM-1927-14 entitled "Standard Test Method for Determination of Oxygen Gas Transmission Rate, Permeability and Permeance at Controlled Relative Humidity Through Barrier Materials Using a Coulometric Detector." Conditions for measurement include: 1 atm pressure, 23° C., and 50% relative humidity on exterior side and 90% relative humidity on interior (sealant side), unless otherwise stated.

The first exterior layer is moisture transmissive or highly moisture transmissive. In one or more embodiments, the first exterior layer comprises a first polymeric material having a moisture vapor transmission rate (MVTR) of greater than or equal to 10 gram·mil/100 $in^2$/day, including greater than 10 gram·mil/100 $in^2$/day, greater than or equal to 20 gram·mil/100 $in^2$/day, greater than 20 gram·mil/100 $in^2$/day, greater than or equal to 25 gram·mil/100 $in^2$/day, or greater than or equal to 30 gram·mil/100 $in^2$/day. In one or more embodiments, the moisture vapor transmission rate (MVTR) of the first polymeric material of the first exterior layer is less than or equal to 80 gram·mil/100 $in^2$/day, including less than or equal to 70 gram·mil/100 $in^2$/day, less than or equal to 60 gram·mil/100 $in^2$/day or less than or equal to 40 gram·mil/100 $in^2$/day. For example, in an embodiment of the multilayer film, the first exterior layer may have an MVTR in the range of greater than 10 gram·mil/100 $in^2$/day to less than or equal to 70 gram·mil/100 $in^2$/day.

In one or more embodiments, the polymeric material of the first exterior layer is a polyamide. In one or more embodiments, the polyamide is a nylon 6,6/6 copolymer (polyhexamethylene adipamide/caprolactam copolymer)-based polymer, or a nylon 6/6,6 copolymer (polycaprolactam/hexamethylene adipamide copolymer)-based polymer. In one or more embodiments, the polyamide is a nylon 6,6/6 copolymer (polyhexamethylene adipamide/caprolactam copolymer), or a nylon 6/6,6 copolymer (polycaprolactam/hexamethylene adipamide copolymer). Other useful polyamides may be block copolymers of polyamide, such as the polyether/polyamide block copolymers sold under the tradename Pebax® MV 3000 by Arkema Technical Polymers. Further suitable copolymers include nylons sold under the tradename Ultramid® C33LN 01 (PA6/66 grade) by BASF and under the tradename 5033 FD825 (PA6/66) by UBE. In one or more embodiments, the polyamide has a MVTR in a range of greater than 10 gram·mil/100 $in^2$/day to less than 40 gram·mil/100 $in^2$/day, and all values and subranges therebetween.

The thickness of the first exterior layer is generally from about 1 micron (0.039 mil) to about 10 microns (0.39 mil), and typically from about 2 microns (0.079 mil) to about 8 microns (0.31 mil).

The multilayer film comprises two or more interior ethylene-vinyl alcohol ("EVOH")-containing layers (i.e. the first and second EVOH layers). The EVOH-containing layers independently comprise an ethylene vinyl alcohol (EVOH). An exemplary EVOH is SoarnoL™ RB7405 (available from Soarus), which is a retortable grade EVOH having 29 mol % ethylene. In one or more embodiments, the EVOH-containing layers independently comprise >97% to 100% EVOH. In one or more embodiments, the EVOH-containing layers each contain 100% EVOH.

The volume percent of each of the first and second EVOH layers is independently from about 1 to about 20% of the oriented outer film by weight, and typically from about 1 to about 15% of the oriented outer film by weight. As compared to the weight of the overall multilayer barrier film the combined weight of the first and second EVOH layers may be less than 10%, by weight. In one or more embodiments, total EVOH-containing layers in the multilayer film is generally from about 2 wt % to about 20 wt %, or from about 2 wt % to about 10 wt %. Preferably, a total amount of EVOH-containing layers is 10% or less, or 8% or less, or 5% or less, by weight, when compared to the overall multilayer barrier film composition.

Similarly, the multilayer barrier film should have an overall composition containing 10% or less, or 5% or less, by weight of polyamide.

The multilayer barrier film has an interior layer between the first and second EVOH layers. This layer serves to separate the EVOH layers, such that the two EVOH layers act independently from each other. While one layer may have excessive moisture exposure, the other is better protected, maintaining a minimum oxygen barrier. Additionally, while one has reduced barrier properties due to prolonged drying time, the other dries quickly and regains a very high oxygen barrier. The separation of the first and second EVOH layers allows for more effective oxygen barrier performance over the entire shelf-life of a retort processed product.

In some embodiments the interior layer between the EVOH-containing layers is moisture transmissive or highly moisture transmissive. In one or more embodiments, the interior layer between the EVOH-containing layers comprises a second polymeric material having a moisture vapor transmission rate (MVTR) of greater than or equal to 10 gram·mil/100 $in^2$/day, including greater than 10 gram·mil/100 $in^2$/day, greater than or equal to 20 gram·mil/100 $in^2$/day, greater than 20 gram·mil/100 $in^2$/day, greater than or equal to 25 gram·mil/100 $in^2$/day, or greater than or equal to 30 gram·mil/100 $in^2$/day. In one or more embodiments, the moisture vapor transmission rate (MVTR) of the second polymeric material of interior layer between the EVOH-containing layers is less than or equal to 80 gram·mil/100 $in^2$/day, including less than or equal to 70 gram·mil/100 $in^2$/day, less than or equal to 60 gram·mil/100 $in^2$/day or less than or equal to 40 gram·mil/100 $in^2$/day. For example, in an embodiment of the multilayer film, the interior layer between the EVOH-containing layers may have an MVTR in the range of greater than 10 gram·mil/100 $in^2$/day to less than or equal to 80 gram·mil/100 $in^2$/day.

In one or more embodiments, the second polymeric material comprises a polyamide. In one or more embodiments, the polyamide comprises a nylon 6,6/6 copolymer (polyhexamethylene adipamide/caprolactam copolymer)-based polymer, or a nylon 6/6,6 copolymer (polycaprolactam/hexamethylene adipamide copolymer)-based polymer. In one or more embodiments, the polyamide comprises a nylon 6,6/6 copolymer (polyhexamethylene adipamide/caprolactam copolymer), or a nylon 6/6,6 copolymer (polycaprolactam/hexamethylene adipamide copolymer). In one or more embodiments, a layer herein comprising a polyamide comprises a MVTR in a range of greater than 10 gram·mil/100 $in^2$/day to less than 40 gram·mil/100 $in^2$/day, and all values and subranges therebetween.

In one or more embodiments, the second polymeric material comprises a propylene-based material. The second polymeric material may be a polypropylene-based tie layer, incorporating a maleic anhydride graft to the polymer. This type of material offers slightly higher moisture protection to the second EVOH layer and excellent adhesion to the first and second EVOH layers.

The thickness of the interior layer between the EVOH-containing layers is generally from about 2 microns (0.079 mil) to about 20 microns (0.79 mil), and typically from about 4 microns (0.16 mil) to about 15 microns (0.59 mil).

The oriented outer film may have a second exterior layer adjacent to the second EVOH layer. The second exterior layer may be directly adjacent to the second EVOH layer. The second exterior layer is located between the second EVOH layer and the sealing layer of the multilayer barrier film. If present, the second exterior layer provides the surface on which the sealing layer is attached. Additionally, if present, the second exterior layer provides the surface of the oriented outer film that may be printed, as will be discussed. The second exterior layer may contain any polymeric materials that provide the correct functionality, such as polyethylene-based polymers, polypropylene-based polymers or polyamide-based polymers. Preferably the second exterior layer of the oriented outer film contains a polyamide.

Figure 2B:
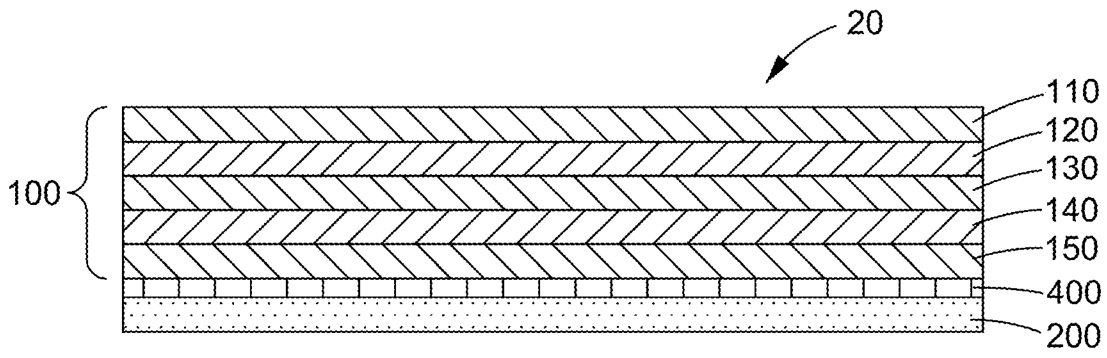

An exemplary embodiment of a multilayer barrier film 20 including an oriented outer film 100 further containing a second exterior layer 150 (relative to FIG. 2A) is shown in FIG. 2B. Oriented outer film 100, which has a first surface and a second surface, is connected to the sealing layer 200 by an adhesive layer 400. The adhesive layer 400 is directly adjacent to the second exterior layer 150 of the oriented outer film. In this configuration, the first exterior layer 110 is the first surface and the second exterior layer 150 is the second surface of the oriented outer film 100.

The multilayer barrier films disclosed herein include a sealing layer that allows the multilayer barrier film to be bonded to itself or other packaging components, forming a package. The sealing layer may form a bond under the influence of pressure or heat or a combination of these conditions. The sealing layer may form a bond under other influence such as ultrasonic energy. A sealing layer may be in the form of a film (i.e. a single layer film or part of a multilayer film) or a coated layer and may be continuous or discontinuous (i.e. patterned).

The sealant film may contain any type of material that will allow for bonding during a package production operation and durability throughout a retort sterilization process and distribution and use of the package. Sealing materials need to be chosen based on the process to be used for sealing and the material/component that the multilayer barrier film will be sealed to. Typical materials used for heat sealing retort packaging include polypropylene copolymers but may be chosen from a wide variety of known sealant materials.

The sealing layer of the multilayer barrier film may be a polymeric based film, manufactured in a separate process, and subsequently adhered to the oriented outer film. Alternatively, a sealing layer may be extruded and simultaneously attached to the oriented outer film in an extrusion coating type operation. Sealing layers may be monolayer or multilayer and may be produced by any known processes. Ideally, the sealing layer has not been oriented and has no embedded stress (i.e. the sealant film has zero or near zero free shrink). The sealing layer may be contained within a non-oriented multilayer film.

Figure 3:
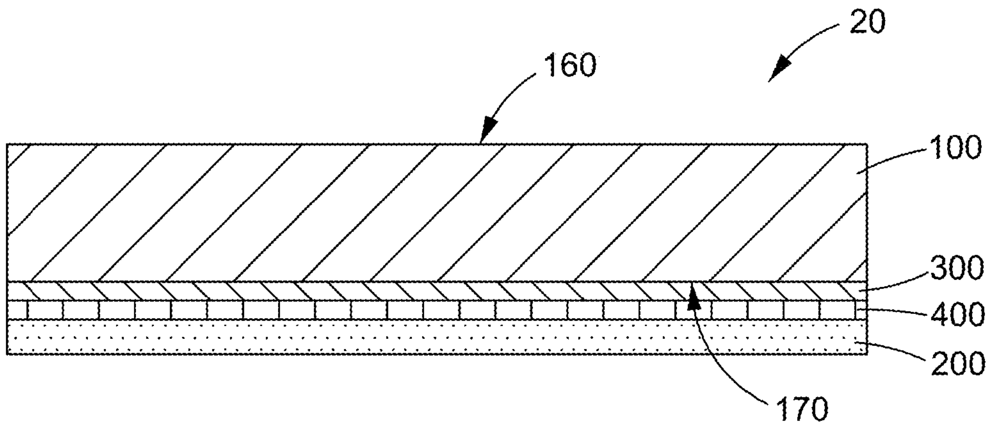
FIG. 3 is another cross-sectional view of an embodiment of the multilayer barrier film.

The sealing layer may be applied directly to the oriented outer film, as shown in FIG. 2A. Alternatively, there may be intervening materials between the oriented outer film and the sealing layer, such as, but not limited to, printed indicia, barrier materials, primers or adhesives. FIG. 3 shows an embodiment of the multilayer barrier film 20 that has an oriented outer film 100, which has a first surface and a second surface, and a sealing layer 200. Between the oriented outer film 100 and the sealing layer 200 are optional layers of printed indicia 300 and adhesive 400. Also shown in FIG. 3 are the two major surfaces of the outer oriented film 100, namely the first surface 160 and the second surface 170. The first surface 160 comprises the first external layer of the outer oriented film 100 and the sealing layer is attached to the outer oriented film 100 at the second surface 170. The printed indicia 300 are located directly adjacent to the second surface 170 of the oriented outer film. This embodiment is an optimal arrangement of materials for high performance packaging films, allowing for optimal positioning of the abuse resistant oriented outer film (on the exterior), the printed indicia (viewable through the oriented outer film yet protected from environmental conditions) and the sealing layer (allowing for sealing on the surface of the film).

The print layer 300, if present, may take any format, in that it may be a continuous layer or may be pattern applied. The print layer, if present, may be of any type of material typically used for flexible packaging. The print layer may be applied by any suitable process including, but not limited to, digital printing, flexographic printing or rotogravure print. The materials used in the print layer should be chosen to be of the type durable for use in the conditions of retort processing. The print layer 300 may be applied to the second surface 170 of the oriented outer film 100, as shown in FIG. 3, but other embodiments may have a print layer on the first surface 160 of the oriented outer web or any other position of the multilayer barrier film. Ideally, the print layer 300 is interior to the multilayer barrier film 20 (i.e. between layers) such that it is protected from scuffing.

METHOD

Also disclosed herein are methods to produce multilayer barrier films that have improvements as described above and methods to produce retort sterilized packaged products from such multilayer barrier films.

Embodiments of methods to produce a multilayer barrier film include producing an oriented outer film containing a first exterior layer comprising a polymeric material having a moisture vapor transmission rate (MVTR) of greater than or equal to 10 gram·mil/100 in$^2$/day, a first EVOH layer adjacent to the first exterior layer, the first EVOH layer containing a first ethylene vinyl alcohol copolymer, an interior layer adjacent to the first EVOH layer, and a second EVOH layer adjacent to the interior layer, the second EVOH layer containing a second ethylene vinyl alcohol copolymer. This film may be produced by coextrusion, lamination, or a combination of these processes. The film is then oriented, either monoaxially or biaxially, and annealed, such that the film has low residual shrink levels (i.e. less than 10%, less than 5% or less than 2% shrink in the MD and TD), resulting in an oriented outer film. A sealing layer is then applied to the oriented outer film, on the surface opposite the first exterior layer. The sealing layer may be attached to the oriented outer film by extrusion lamination, adhesive lamination or any other known technique for combining layers in a film.

Some embodiments of producing the multilayer barrier film may also include printing the oriented outer film prior to attaching the sealing layer. Print may be placed by any known web-based printing method and may be applied to either side of the oriented outer film, preferably on the surface opposite of the first exterior layer.

The multilayer barrier film may be used in a method to produce a retort sterilized packaged product. The multilayer barrier film is attached to itself or other packaging components, creating an initial package. The package is then filled with a product and hermetically sealed. The multilayer barrier film may be attached to itself, attached to other packaging components, and/or the package may be hermetically sealed by any known means such as heat sealing, ultrasonic sealing or a combination of various methods. Preferably the attachments and sealing is done by heat sealing. Subsequent to hermetically sealing the package, the packaged product is submitted to a retort sterilization process, thereby creating a retort sterilized package with extended shelf-life.

EXAMPLES AND DATA

The properties and advantages of the multilayer barrier films disclosed herein are further demonstrated by the following examples and data.

Several film structures that represent various embodiments of the multilayer barrier film are given in the non-exhaustive list below:

PA/EVOH/PA/EVOH/PA//adh//PP sealant
PA/EVOH/PA/PA/PA/EVOH/PA//PP sealant
PA/EVOH/PP tie/PP/PPtie/EVOH/PA/PP sealant
PA/EVOH/PP tie/EVOH/PA//adh//PP sealant Three films were made by blown film coextrusion, each having the structure of: polyamide/EVOH/PP tie/PP/PP tie/EVOH/polyamide. The exact structure and material details are outlined in Table 1. Comparative Film Example (A was made at a thickness of 50.8 microns (2 mil) and will be used unoriented, serving as a comparative example. Film Example 2A was oriented using an MDO process to become Film Example 2B, reducing the thickness from 101.6 microns (4 mil) to 50.8 microns (2 mil) (i.e. a 2× orientation ratio). Film Example 3A was oriented using an MDO process to become Film Example 3B, reducing the thickness from 152.4 microns (6 mil) to 50.8 microns (2 mil) (i.e. a 3× orientation ratio).

TABLE 1

Film details for outer films Comparative Film Example 1A and Film Examples 2A, 2B, 3A and 3B

| Layer 1 (first exterior layer) | Layer 2 (first EVOH layer) | Layer 3 (part of interior layer) | Layer 4 (part of interior layer) | Layer 5 (part of interior layer) | Layer 6 (second EVOH layer) | Layer 7 (second exterior layer) |
|---|---|---|---|---|---|---|
| Comparative Film Example 1A, total thickness 2 mil, unoriented | | | | | | |
| 0.2 mil 100% copolyamide 6/66 | 0.4 mil 100% EVOH[1] | 0.2 mil 100% PP tie[2] | 0.2 mil 100% hPP[3] | 0.2 mil 100% PP tie[2] | 0.4 mil 100% EVOH[1] | 0.4 mil 100% copolyamide 6/66 |
| Film Example 2A, total thickness 4 mil, unoriented | | | | | | |
| 0.4 mil 100% copolyamide 6/66 | 0.8 mil 100% EVOH[1] | 0.4 mil 100% PP tie[2] | 0.4 mil 100% hPP[3] | 0.4 mil 100% PP tie[2] | 0.8 mil 100% EVOH[1] | 0.8 mil 100% copolyamide 6/66 |
| Film Example 2B, total thickness 2 mil, oriented 2X | | | | | | |
| 0.2 mil 100% copolyamide 6/66 | 0.4 mil 100% EVOH[1] | 0.2 mil 100% PP tie[2] | 0.2 mil 100% hPP[3] | 0.2 mil 100% PP tie[2] | 0.4 mil 100% EVOH[1] | 0.4 mil 100% copolyamide 6/66 |
| Film Example 3A, total thickness 6 mil, unoriented | | | | | | |
| 0.6 mil 100% copolyamide 6/66 | 1.2 mil 100% EVOH[1] | 0.6 mil 100% PP tie[2] | 0.6 mil 100% hPP[3] | 0.6 mil 100% PP tie[2] | 1.2 mil 100% EVOH[1] | 1.2 mil 100% copolyamide 6/66 |
| Film Example 3B, total thickness 2 mil, oriented 3X | | | | | | |
| 0.2 mil 100% copolyamide 6/66 | 0.4 mil 100% EVOH[1] | 0.2 mil 100% PP tie[2] | 0.2 mil 100% hPP[3] | 0.2 mil 100% PP tie[2] | 0.4 mil 100% EVOH[1] | 0.4 mil 100% copolyamide 6/66 |

[1] EVOH is 29 mol % ethylene
[2] PP tie is a blend of a polypropylene homopolymer and a maleic anhydride grafted polypropylene copolymer
[3] hPP is a polypropylene homopolymer The moisture barrier of Comparative Film Example A and Film Example 3B was tested according to ASTM 1249-13 at conditions of 100° F., 90% relative humidity. Results are shown in Table 2. It is likely that the increase in moisture barrier is due to the orientation of the interior polypropylene containing layers. Orientation of this film may benefit the dual EVOH layer design even further due to better protection of the second EVOH layer during the retort process.

TABLE 2

MVTR Data for the Unoriented and Oriented Outer Film

| Sample Identification | Sample Thickness | MVTR (g/m$^2$/day) |
|---|---|---|
| Comparative Film Example 1A | 1.83 | 7.37 |
| Comparative Film Example 1A | 2.29 | 7.09 |
| Film Example 3B | 2.04 | 5.07 |
| Film Example 3B | 2.39 | 5.28 |

Stiffness of the oriented outer film is also an advantage of the films discussed herein. Machine and transverse direction loop stiffness of the oriented outer film was tested by the following method. Samples were cut from the films using a 4-inch by 4-inch template, noting the machine direction of the films. The samples were loaded into a holder in the bottom crosshead of a tensile testing unit, the holder looping the sample into an inverted U-shape with the vertical sections of the U held 1 inch from each other. The film is inserted making sure the first exterior layer of the material is facing up. MD specimens are mounted with the MD traveling the length of the loop. TD specimens are mounted with MD perpendicular to the length of the loop. The upper crosshead of the tensile testing unit has a flat breaker plate which is lowered to a position just slightly above the sample. The test is run using a crosshead speed of 5 in/min and a stop distance of 0.5 in. The force of the loop against the breaker plate is recorded as the loop stiffness. Samples were tested at 73° F. Five measurements were taken for each variable and the average of the results are shown in Table 3. A significant increase in stiffness is noted.

TABLE 3

Loop Stiffness Data for the Unoriented and Oriented Outer Film

| Sample Identification | Loop Stiffness, machine direction, g | Loop Stiffness, transverse direction, g |
|---|---|---|
| Comparative Film Example 1A | 11.4 | 11.0 |
| Film Example 3B | 32.9 | N/A* |

*The transverse direction samples of Film Example 3B did not curve well in the test and are thus unreported.

Each of the outer film examples 1A, 2B and 3B were laminated to a multilayer film containing a sealing layer to create completed barrier films. The multilayer film has the structure of 16.5 microns HDPE-PP/26.7 microns white HDPE-PP/7.1 microns PIB-PP, where HDPE-PP is a blend of high-density polyethylene and propylene-based copolymers, white HDPE-PP is a blend of high-density polyethylene, propylene-based copolymers, propylene homopolymer and white pigment, and PIB-PP is a blend of propylene-based polymers and polyisobutylene. The outer films were laminated to the HDPE-PP side of the multilayer film using a two-component dry bond adhesive. The PIB-PP layer of the multilayer film creates a strong yet peelable seal when heat sealed to itself or various other materials.

Comparative Film Example 1A laminated to the multilayer film containing a sealing layer is Comparative Film Example 1C. Film Example 2B laminated to the multilayer film containing a sealing layer is Film Example 2C. Film Example 3B laminated to the multilayer film containing a sealing layer is Film Example 3C.

Figure 4:
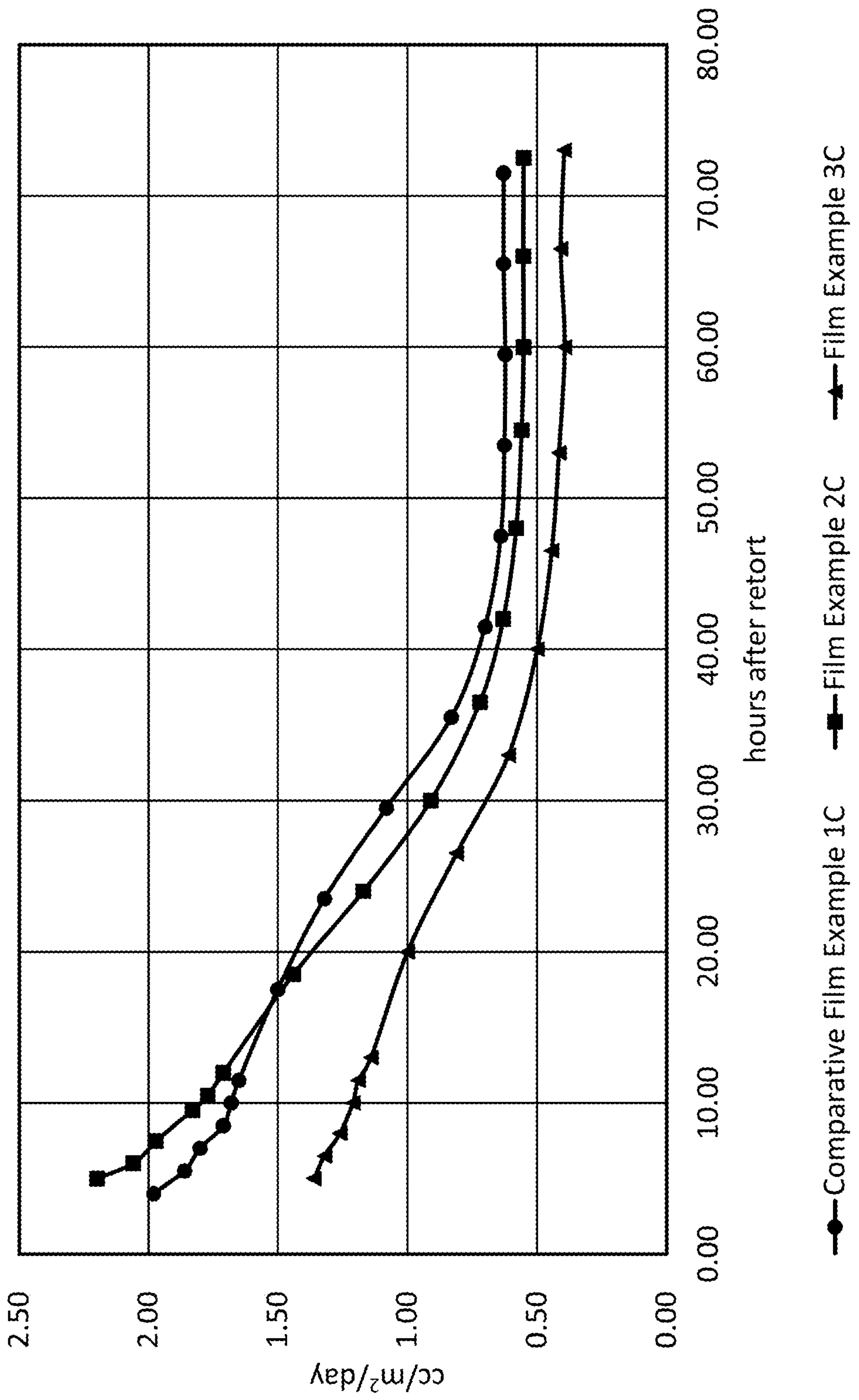
FIG. 4 is a chart showing retort recovery curves for comparative examples and multilayer barrier film examples.

The laminated films of 1C, 2C and 3C were retorted using a water spray method at 230° F., 10-minute cook cycle and 30 psi overpressure. The retorted film samples were then immediately loaded onto a testing apparatus to monitor the oxygen transmission rate over time. The test was run according to ASTM 1927-14, using conditions of 50% relative humidity on the "exterior" and 90% humidity on the "interior" and a temperature of 73° F. Results of that testing are shown in FIG. 4. The data indicates that the films containing an oriented outer web (Film Examples 2C and 3C) have better oxygen barrier (lower oxygen transmission) after the film has recovered from retort shock than the film containing the unoriented outer web (Comparative Film Example 1C).

EMBODIMENTS

A. A multilayer barrier film comprising an oriented outer film and a sealing layer attached to the oriented outer film, the oriented outer film comprising:
- a first exterior layer, the first exterior layer comprising a first polymeric material having a moisture vapor transmission rate (MVTR) of greater than or equal to 10 gram·mil/100 in$^2$/day,
- a first EVOH layer adjacent to the first exterior layer, the first EVOH layer comprising a first ethylene vinyl alcohol copolymer,
- an interior layer adjacent to the first EVOH layer,
- a second EVOH layer adjacent to the interior layer, the second EVOH layer comprising a second ethylene vinyl alcohol copolymer.

B. The multilayer barrier film according to any other previous embodiment wherein the moisture vapor transmission rate (MVTR) of the first polymeric material of the first exterior layer is in a range of greater than 10 gram·mil/100 in$^2$/day to less than 80 gram·mil/100 in$^2$/day.

C. The multilayer barrier film according to any other previous embodiment wherein the first polymeric material is a polyamide.

D. The multilayer barrier film according to any other previous embodiment wherein the interior layer comprises a second polymeric material having a moisture vapor transmission rate (MVTR) greater than or equal to 10 gram·mil/100 in$^2$/day.

E. The multilayer barrier film according to any other previous embodiment wherein the interior layer comprises a second polymeric material having a moisture vapor transmission rate (MVTR) in a range of greater than 10 gram·mil/100 in$^2$/day to less than 80 gram·mil/100 in$^2$/day.

F. The multilayer barrier film according to any other previous embodiment wherein the interior layer comprises a second polymeric material and the second polymeric material is a polyamide.

G. The multilayer barrier film according to any other previous embodiment wherein the oriented outer film further comprises a second exterior layer comprising a third polymeric material.

H. The multilayer barrier film according to any other previous embodiment wherein the third polymeric material is a polyamide.

I. The multilayer barrier film according to any other previous embodiment wherein the sealing layer comprises a propylene-based polymer.

J. The multilayer barrier film according to any other previous embodiment wherein the sealing layer is comprised in a non-oriented film.

K. The multilayer barrier film according to any other previous embodiment, further comprising an adhesive layer between the sealing layer and the outer oriented film.

L. The multilayer barrier film according to any other previous embodiment, further comprising a print layer between the sealing layer and the oriented outer film.

M. The multilayer barrier film according to any other previous embodiment wherein a thickness of the oriented outer film is greater than or equal to 10 microns and less than or equal to 76 microns.

N. The multilayer barrier film according to any other previous embodiment wherein an overall composition of the multilayer barrier film comprises less than or equal to 10% polyamide by weight.

O. The multilayer barrier film according to any other previous embodiment wherein an overall composition of the multilayer barrier film comprises less than or equal to 10% EVOH by weight.

P. A multilayer barrier film comprising:

an oriented outer film comprising, i) a first surface comprising a first exterior layer, the first exterior layer comprising a first polyamide, ii) a first EVOH layer adjacent to the first exterior layer, the first EVOH layer comprising a first ethylene vinyl alcohol copolymer, iii) an interior layer adjacent to the first EVOH layer, the interior layer comprising a first propylene-based polymer, iv) a second EVOH layer adjacent to the interior layer, the second EVOH layer comprising a second ethylene vinyl alcohol copolymer, and v) a second surface comprising a second exterior layer, a print layer located on at least one of the first surface and the second surface of the oriented outer film, and a sealing layer comprising a second propylene-based polymer, wherein the sealing layer is connected to the second surface of the oriented outer film.

Q. The multilayer barrier film according to embodiment P wherein an overall composition of the multilayer barrier film comprises less than or equal to 10% polyamide by weight and less than or equal to 10% EVOH by weight.

R. The multilayer barrier film according to embodiment P or Q wherein the multilayer barrier film is free from polyester layers and metal layers.

S. A retort sterilized packaged product comprising a multilayer barrier film comprising an oriented outer film and a sealing layer attached to the oriented outer film, the oriented outer film comprising:

a first surface comprising a first exterior layer, the first exterior layer comprising a first polymeric material having a moisture vapor transmission rate (MVTR) of greater than or equal to 10 gram·mil/100 in$^2$/day, a first EVOH layer adjacent to the first exterior layer, the first EVOH layer comprising a first ethylene vinyl alcohol copolymer, an interior layer adjacent to the first EVOH layer, a second EVOH layer adjacent to the interior layer, the second EVOH layer comprising a second ethylene vinyl alcohol copolymer, and a second surface, wherein the sealing layer is attached to the second surface of the oriented outer film.

T. The retort sterilized packaged product according to embodiment S wherein the sealing layer is comprised in a non-oriented film.

U. A retort sterilized packaged product incorporating any multilayer barrier film of embodiments A-R.

What is claimed is:

1. A multilayer barrier film comprising an oriented outer film and an unoriented sealing layer attached to the oriented outer film, the oriented outer film comprising:

a first exterior layer, the first exterior layer comprising a first polymeric material having a moisture vapor transmission rate (MVTR) of greater than or equal to 10 gram·mil/100 in$^2$/day, a first EVOH layer adjacent to the first exterior layer, the first EVOH layer comprising a first ethylene vinyl alcohol copolymer, an interior layer adjacent to the first EVOH layer, and a second EVOH layer adjacent to the interior layer, the second EVOH layer comprising a second ethylene vinyl alcohol copolymer, wherein the multilayer barrier film is free from polyester layers and metal layers.

2. The multilayer barrier film according to claim 1 wherein the moisture vapor transmission rate (MVTR) of the first polymeric material of the first exterior layer is in a range of greater than 10 gram·mil/100 in$^2$/day to less than 80 gram·mil/100 in$^2$/day.

3. The multilayer barrier film according to claim 1 wherein the first polymeric material is a polyamide.

4. The multilayer barrier film according to claim 1 wherein the interior layer comprises a second polymeric material having a moisture vapor transmission rate (MVTR) greater than or equal to 10 gram·mil/100 in$^2$/day.

5. The multilayer barrier film according to claim 1 wherein the interior layer comprises a second polymeric material having a moisture vapor transmission rate (MVTR) in a range of greater than 10 gram·mil/100 in$^2$/day to less than 80 gram·mil/100 in$^2$/day.

6. The multilayer barrier film according to claim 1 wherein the interior layer comprises a second polymeric material and the second polymeric material is a polyamide.

7. The multilayer barrier film according to claim 1 wherein the oriented outer film further comprises a second exterior layer comprising a third polymeric material.

8. The multilayer barrier film according to claim 7 wherein the third polymeric material is a polyamide.

9. The multilayer barrier film according to claim 1 wherein the sealing layer comprises a propylene-based polymer.

10. The multilayer barrier film according to claim 1 wherein the sealing layer is comprised in a non-oriented film.

11. The multilayer barrier film according to claim 1, further comprising an adhesive layer between the sealing layer and the outer oriented film.

12. The multilayer barrier film according to claim 1, further comprising a print layer between the sealing layer and the oriented outer film.

13. The multilayer barrier film according to claim 1 wherein a thickness of the oriented outer film is greater than or equal to 10 microns and less than or equal to 76 microns.

14. The multilayer barrier film according to claim 1 wherein an overall composition of the multilayer barrier film comprises less than or equal to 10% polyamide by weight.

15. The multilayer barrier film according to claim 1 wherein an overall composition of the multilayer barrier film comprises less than or equal to 10% EVOH by weight.

16. A multilayer barrier film comprising:

an oriented outer film comprising, i) a first surface comprising a first exterior layer, the first exterior layer comprising a first polyamide, ii) a first EVOH layer adjacent to the first exterior layer, the first EVOH layer comprising a first ethylene vinyl alcohol copolymer, iii) an interior layer adjacent to the first EVOH layer, the interior layer comprising a first propylene-based polymer, iv) a second EVOH layer adjacent to the interior layer, the second EVOH layer comprising a second ethylene vinyl alcohol copolymer, and v) a second surface comprising a second exterior layer, a print layer located on at least one of the first surface and the second surface of the oriented outer film, and a sealing layer comprising a second propylene-based polymer, wherein the sealing layer is connected to the second surface of the oriented outer film, and wherein the multilayer barrier film is free from polyester layers and metal layers.

17. The multilayer barrier film according to claim 16 wherein an overall composition of the multilayer barrier film comprises less than or equal to 10% polyamide by weight and less than or equal to 10% EVOH by weight.

18. A retort sterilized packaged product comprising a multilayer barrier film comprising an oriented outer film and a sealing layer attached to the oriented outer film, the oriented outer film comprising:

a first surface comprising a first exterior layer, the first exterior layer comprising a first polymeric material having a moisture vapor transmission rate (MVTR) of greater than or equal to 10 gram·mil/100 $in^2$/day, a first EVOH layer adjacent to the first exterior layer, the first EVOH layer comprising a first ethylene vinyl alcohol copolymer, an interior layer adjacent to the first EVOH layer, a second EVOH layer adjacent to the interior layer, the second EVOH layer comprising a second ethylene vinyl alcohol copolymer, and a second surface, wherein the sealing layer is attached to the second surface of the oriented outer film.

19. The retort sterilized packaged product according to claim 18 wherein the sealing layer is comprised in a non-oriented film.

* * * * *